United States Patent [19]
Bernhardt et al.

[11] Patent Number: 5,522,694
[45] Date of Patent: Jun. 4, 1996

[54] VENTING DEVICE FOR MAGNETICALLY SUPPORTED VACUUM PUMPS

[75] Inventors: Helmut Bernhardt, Wetzlar, Germany; René Larsonneur, Wallisellen, Switzerland

[73] Assignee: Balzers Pfeiffer GmbH, Asslar, Germany

[21] Appl. No.: 464,012

[22] Filed: Jun. 5, 1995

[51] Int. Cl.⁶ .............................. F01D 21/04; F01D 1/36
[52] U.S. Cl. ...................... 415/14.000; 415/90; 415/229; 310/90.5
[58] Field of Search ................... 415/14, 90, 229; 310/90.5; 417/365, 423.4, 423.12

[56] References Cited

U.S. PATENT DOCUMENTS 5,046,151  9/1991  Yamamura ........................... 310/90.5
5,209,631  5/1993  Bernhardt ................................. 415/90

FOREIGN PATENT DOCUMENTS 0129191  6/1988  Japan ...................................... 415/90

Primary Examiner—Edward K. Look
Assistant Examiner—Christopher Verdier
Attorney, Agent, or Firm—Anderson Kill Olick & Oshinsky

[57] ABSTRACT

A venting arrangement for a magnetically supported vacuum pump which has a high speed rotor, wherein the load carrying capacity of the axial magnetic bearing is increased in the course of the venting process by reducing the gap between the axial support disk and the axial magnet in order to carry the additional forces caused by the venting process. In normal operation, the gap is adjusted to an upper limit value.

2 Claims, 1 Drawing Sheet

VENTING DEVICE FOR MAGNETICALLY SUPPORTED VACUUM PUMPS

FIELD OF THE INVENTION

The present invention pertains to a venting device for magnetically supported vacuum pumps, and in particular, to vacuum pumps which are equipped with a high speed rotor.

BACKGROUND OF THE INVENTION

Turbomolecular pumps are part or the nigh speed vacuum pumps which are most widely used. Turbomolecular pumps assure an oil vapor-free pumping technology due to their selective pump behavior. If, however, a turbomolecular pump is stopped, oil vapors and other impurities can travel from the fore-vacuum side to the high or hard vacuum side and can there cause considerable contamination, which is noticed in a very disadvantageous manner as an initial contamination when the pump is switched on again.

The contamination in particular, hydrocarbons and water, entail a considerable lengthening of the pump-down time. This can be prevented by flooding or venting the turbomolecular pump with an inert gas after it is stopped. Therein, the inner surfaces of the pump and the container are covered by the inert gas whereby the pump-down time is considerably shortened after the pump is switched again. Apart from that the venting or flooding causes a reduction of the coasting time of the rotor. This is criteria which is particularly important in pumps running on magnetic bearings in view of the lack of friction.

Turbomolecular pumps with venting or flooding devices are described in the DE-PS 18 09 902 and in the Journal "Vacuum Technology" (20th year 1971) volume 7, page 201 and following.

It is evident from these publications, that it was possible to establish several venting conditions in an optimal manner, in order to achieve as short a pump-down time as possible after the pump has been switched on again. An important problem has, however to date, been treated in an extremely unsatisfactory manner. This applies to the venting rate. The statement of the problem herein is the velocity with which the venting or flooding gas can be introduced into the pump, in order to further improve the optimum venting conditions, and in order to largely avoid disadvantageous effects.

The above-described problem exists, in particular, in pumps which run on magnetic bearings. The criteria which must be considered in this case, above all is the long coasting time which is caused by the lack of friction and the limitation of external forces acting upon the rotor.

The question of the venting rate is, to begin with, reduced to the cross section of the valve aperture. With a small cross section, meaning, if the pump is vented too slowly, there results an excessive coasting time of the rotor, which in most cases, can no longer be justified. With a large cross section, the forces which act upon the rotor, due to the gas flowing in, are so high that critical situations can arise where, for instance, the rotor comes into contact with the emergency bearing due to overloading the axial bearing. With average cross sections, the two disadvantageous effects overlap so that no satisfactory solution can be achieved by varying the cross section of the valve aperture. It has to be added thereto, that with the same constructional size of a pump, containers having greatly differing volumes can be closed, which additionally complicates the prior determination of optimum venting conditions for a specific type of pump.

The possibility of varying the venting rate consists in opening and closing the venting valve at intervals which have been fixedly predetermined time-wise. This requires additional effort which is not justified by the results. An optimum venting process cannot be achieved even by the above, since differing envelope conditions, for instance, the container size, type and pressure of the venting gasses and the operation of the fore pump are not considered herein. Depending upon the cycling times, there results the same disadvantages as described above.

A solution is stated in the DE-OS 40 22 523. Here, an optimum venting rate is achieved in that the forces acting upon the rotor are measured and the venting valve is actuated therein by means of a control device. The opening times of the venting valve are then optimized, in such a way, that as large a gas quantity as possible is allowed to flow in, wherein the forces, which then act collectively upon the rotor, do not exceed a predetermined magnitude which is defined by safety criteria. In rotors having an actively regulated magnetic support, in most cases, a force measurement is available by means of measured values, which are, in any case, available in the regulation circuit of the magnetic bearing. In this case, the current in the electromagnets of the magnetic bearing is a direct measurement of the force.

However, several criteria still exist which have not been taken account of in the solution just described above. The optimum position of the rotor is limited by the top and bottom magnitudes of the air gaps in the axial magnetic bearing. The maximum gap is limited since, with a much larger gap, the forces in the bearing diminish, so that, beginning with a specific value, a stable position of the rotor can no longer be assured.

The forces increase with reduction of the gap. At the same time, the natural frequencies of the regulation circuit increase until they no longer can be damped out, and the regulation circuit thus becomes unstable. This defines the bottom limit for the associated air gap. Apart from that, the forces upon the rotor also increase at smaller air gaps, which forces arise due to the working motion of the regulation cycle or circuit and the always existing more or less strong or pronounced interferences or malfunctions. Thus, also the reaction forces on the pump housing increase. In a great many application cases, these vibrations of the pump housing are very annoying or even unacceptable. Therefore, in continuous operation, the gap of the magnetic bearing should remain as close as possible to the upper limit value.

During a venting process, however, when a higher load bearing capacity is specified for the magnetic bearing as has already been mentioned above, the larger forces of the magnetic bearing at a rotor position close to the bottom limit value would be advantageous. In this case, the larger vibrations would cause no trouble since the pump is coasting.

SUMMARY OF THE INVENTION

The present invention is based upon the task to propose a venting device for magnetically supported vacuum pumps which have a high speed rotor, which refines the existing arrangements of this type without increasing the technical effort.

The present invention provides an apparatus for the venting of magnetically supported vacuum pumps which have high speed rotors with at least one actively controlled or regulated electromagnetic axial bearing and with a controllable venting device. The apparatus of the present invention is characterized in that a nominal value resetting unit exists which engages in such a way into the regulation cycle or circuit of the axial magnetic bearing, by means of a progress control, that the air gap between the axial support and the axial magnet is reduced to the extent permissible by regulation technology.

The apparatus for the venting of magnetically supported vacuum pumps which have high speed rotors, which is the subject of the present invention, may further be characterized in that the nominal value presetting unit adjusts the air gap between the axial support disk and the axial magnet in normal operation to an upper limit value.

The solution of the present invention permits an optimum venting of a magnetically supported vacuum pump which has a high speed rotor while utilizing the higher load carrying capacity of the magnetic bearing at smaller gaps. At the same time, the optimum gap, in this case, is retained in continuous operation thereby assuring a safe and smooth operation.

Accordingly, it is an object of the present invention to provide an apparatus for the venting of magnetically supported vacuum pumps which have high speed rotors with at least one actively controlled or regulated electromagnetic axial bearing and with a controllable venting device, wherein a nominal value presetting unit exists which engages in such a way into the regulation cycle or circuit of the axial magnetic bearing, by means of a progress control, that the air gap between the axial support and the axial magnet is reduced to the extent permissible by regulation technology.

It is another object of the present invention to provide an apparatus for venting magnetically supported vacuum pumps which have high speed rotors which are further characterized in that the nominal value presetting unit adjusts the air gap between the axial support disk and the axial magnet in normal operation to an upper limit value.

It is yet another object of the present invention to provide an apparatus which permits an optimum venting of a magnetically supported vacuum pump which has a high speed rotor while utilizing the higher load carrying capacity of the magnetic bearing at smaller gaps while, at the same time, the optimum gap is retained in continuous operation thereby assuring a safe and smooth operation.

Other objects and advantages of the present invention will be apparent to those skilled in the art upon a review of the Description of the Preferred Embodiment taken in conjunction with the drawings which follow.

DESCRIPTION OF THE PREFERRED EMBODIMENT

Figure 1:
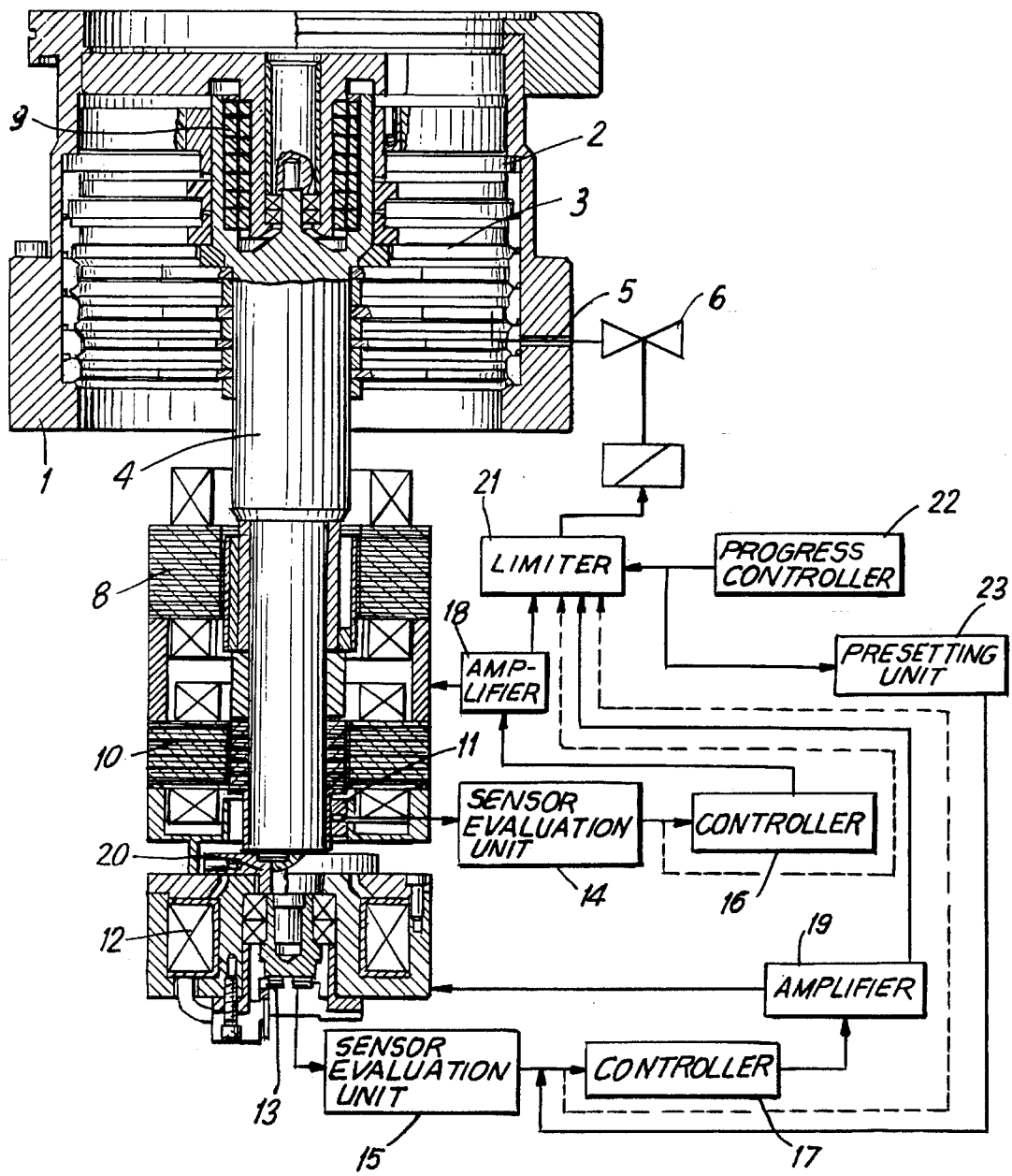
FIG. 1 illustrates a typical magnetically supported turbomolecular pump wherein the venting device of the present invention is utilized.

FIG. 1 illustrates a typical magnetically supported turbomolecular pump wherein the venting device of the present invention is utilized. With reference to FIG. 1, the pump elements, which consist of stator disks 2 and rotor disks 3 which are connected to the rotor shaft 4, are located in the housing 1 of a turbomolecular pump. A short feed pipe for the gas 5 with the controllable venting valve 6 is fastened at the housing 1 in order to permit venting gas to enter.

The driving device for the rotor shaft 4 is designated by the reference numeral 8. The support of the rotor is achieved, in the example shown here, by a passive magnetic radial bearing 9 on the top side of the pump, where the suction stub is located, by an active magnetic radial bearing 10 below the drive unit 8 and by an active magnetic axial bearing 12 at the bottom end of the rotor shaft. The radial sensors 11 and the axial sensor 13 serve for measuring the radial or the axial position of the rotor shaft. Control signals are generated by the sensor evaluation units 14 and 15 and the regulators 16 and 17, which regulate the currents in the active magnetic bearings through power amplifiers 18 and 19, in such a way, that the rotor remains in a stable position.

The regulation or control of the active magnetic axial bearing occurs, for instance, in such a way, that the gaps between the axial magnets 12 and the axial bearing or support 20 are kept constant. If an additional force acts upon the rotor, a current in the electromagnets changes and is thus a direct measure of the force.

Due to the monitoring of the limiting value 21, the venting valve 6 is closed when a predetermined current intensity is exceeded, which current intensity corresponds to a specific force upon the rotor.

Subsequently, a pressure compensation occurs inside of the pump, whereby the force of the rotor is again reduced. Therefore, the current intensity falls and the venting valve is again opened.

In addition, a nominal value presetting unit 23 is present in the invention, which engages by means of a progress control 22 into the regulation cycle 15, 17, 19 of the axial magnetic bearing 12 at the start of a venting process. Herein, the air gap between the axial support disk 20 and the axial magnet 12 is reduced to such an extent as is permissible regulation technology-wise. The axial magnetic bearing 12 now has achieved its maximum load bearing capacity and can carry the large forces caused by the venting operation. In normal operation, the air gap is increased up to an upper limit value. Thereby, vibrations are largely prevented and smooth and safe operation of the rotor is assured. The duration of the venting process is reduced down to a minimum.

While the present invention has been described and illustrated in a preferred embodiment, such is meant to be merely illustrative of the present invention and is not to be construed to be a limitation thereof. Accordingly, the present invention encompasses any and all alternate embodiments, modifications and/or variations, including use of the present invention with other types of vacuum pumps and their supports or bearings, which may be axial or radial, with the scope of the present invention being limited only by the claims which follows.

What is claimed is:

1. An apparatus for venting magnetically supported vacuum pumps which have high speed rotors, which comprises:

at least one electromagnetic axial bearing which is actively controlled, which further comprises:
a control loop;
a controllable venting device;
a nominal value presetting unit; and
a progress control device;
wherein said nominal value presetting unit engages into said regulation circuit of said at least one electromagnetic axial bearing by means of said progress control device in such a manner that an air gap between an axial thrust disk and an axial magnet is reduced to a permissible level.

2. The apparatus of claim 1, wherein said nominal value presetting unit adjusts the air gap between said axial thrust disk and said axial magnet in normal operation to an upper limit value.

* * * * *

UNITED STATES PATENT AND TRADEMARK OFFICE
CERTIFICATE OF CORRECTION

PATENT NO. : 5,522,694

DATED : June 4, 1996

INVENTOR(S) : HELMUT BERNHARDT & RENE' LARSONNEUR

It is certified that error appears in the above-indentified patent and that said Letters Patent is hereby corrected as shown below:

On the title page, item [30], should read

Foreign Application Priority Data

August 7, 1995 [DE]  Germany...............P 4427153.0

Signed and Sealed this

Seventeenth Day of September, 1996

BRUCE LEHMAN

*Attest:*

*Attesting Officer*     *Commissioner of Patents and Trademarks*